US009862399B2

(12) United States Patent
Perez et al.

(10) Patent No.: US 9,862,399 B2
(45) Date of Patent: Jan. 9, 2018

(54) DOLLY FOR CONNECTION TO CHILD CAR SEAT TO FORM A STROLLER

(71) Applicants: Edvin R. Perez, San Diego, CA (US); Michelle O Perez, San Diego, CA (US)

(72) Inventors: Edvin R. Perez, San Diego, CA (US); Michelle O Perez, San Diego, CA (US)

(*) Notice: Subject to any disclaimer, the term of this patent is extended or adjusted under 35 U.S.C. 154(b) by 0 days.

(21) Appl. No.: 14/874,312

(22) Filed: Oct. 2, 2015

(65) Prior Publication Data

US 2016/0023676 A1 Jan. 28, 2016

Related U.S. Application Data

(63) Continuation of application No. 14/154,457, filed on Jan. 14, 2014, now Pat. No. 9,162,697.

(51) Int. Cl.
*B62B 5/00* (2006.01)
*B60N 2/28* (2006.01)
*B62B 7/14* (2006.01)
*B62B 7/02* (2006.01)

(52) U.S. Cl.
CPC .......... *B62B 5/0083* (2013.01); *B60N 2/2848* (2013.01); *B62B 7/02* (2013.01); *B62B 7/145* (2013.01)

(58) Field of Classification Search
CPC .. B62B 3/02; B62B 1/12; B62B 1/208; B62B 1/206; B62B 1/26; B62B 1/08; B62B 7/08; B62B 7/06; B62B 7/04; B60N 2/2806; B60N 2/2854
See application file for complete search history.

(56) References Cited

U.S. PATENT DOCUMENTS

2002/0038967 A1* 4/2002 Brandler ............. B60N 2/2845 297/250.1
2004/0173997 A1* 9/2004 Voll ........................ A47C 7/006 280/652

* cited by examiner

*Primary Examiner* — John Walters
*Assistant Examiner* — James Triggs
(74) *Attorney, Agent, or Firm* — John R. Ross; John R Ross, III

(57) ABSTRACT

A dolly that connects to a child car seat to form a stroller. A connection axle includes a connection mechanism that connects the connection axle to preexisting features on the child car seat. Two wheels are rotatably connected to the connection axle. A handle attachment piece is rigidly connected to the connection axle. A handle is connected to the handle attachment piece. In a preferred embodiment the child car seat is slip fit onto the connection axle.

21 Claims, 5 Drawing Sheets

DOLLY FOR CONNECTION TO CHILD CAR SEAT TO FORM A STROLLER

The present invention relates to child accessory devices, and in particular, to child car seats and strollers. This application is a continuation-in-part of U.S. patent application Ser. No. 14/154,457, filed Jan. 14, 2014, which is incorporated by reference herein.

BACKGROUND OF THE INVENTION

Child car seats are well known. Children, when they are babies and very young, are placed in child car seats for safety while they are being transported in an automobile. Typically, a child car seat is configured so that it can be connected to a car seat base. The car seat base is configured to stay inside the automobile at all times and is held in place by a seat belt. The child car seat can then be snap fit or slip fit onto the base to secure the car seat to the seat of the automobile. Often parents and care givers will remove the car seat from the base if they wish to carry the child and the car seat to another location.

Parents and child care givers also commonly use strollers to transport the child. Often the parent will need to carry the stroller so that it is always available for usage. Strollers include a handle that allow the parents to move the stroller as they wish. Handles and strollers are well known in the prior art. In addition to the car seat, having to carry around a stroller can be time consuming, tedious and frustrating.

What is needed is a device that easily transforms a preexisting, commonly available car seat into stroller.

SUMMARY OF THE INVENTION

The present invention provides a dolly that connects to a child car seat to form a stroller. A connection axle includes a connection mechanism that connects the connection axle to preexisting features on the child car seat. Two wheels are rotatably connected to the connection axle. A handle attachment piece is rigidly connected to the connection axle. A handle is connected to the handle attachment piece. In a preferred embodiment the child car seat is slip fit onto the connection axle.

DEFINITION OF TERMS

Figures 1, 2, 3:
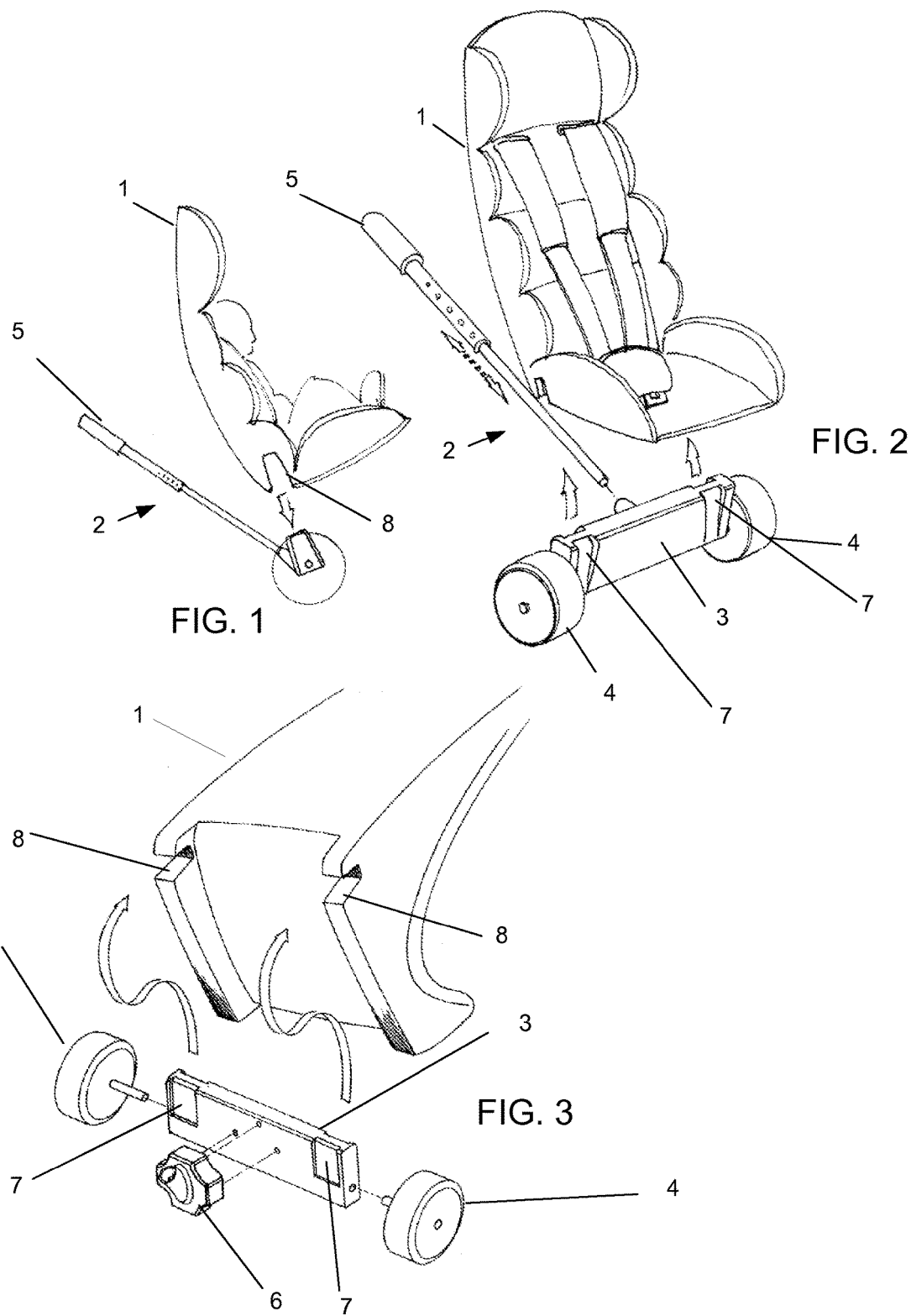
FIGS. 1-3 show a preferred embodiment of the present invention.

The terms "comprising" and "including" are used herein in their open, non-limiting sense. Other terms and phrases used in this document, and variations thereof, unless otherwise expressly stated, should be construed as open ended as opposed to limiting. As examples of the foregoing: the term "example" is used to provide exemplary instances of the item in discussion, not an exhaustive or limiting list thereof; adjectives such as "conventional," "traditional," "normal," "known," and terms of similar meaning should not be construed as limiting the item described to a given time period or to an item available as of a given time, but instead should be read to encompass conventional, traditional, normal, or criterion technologies that may be available or known now or at any time in the future. Likewise, where this document refers to technologies that would be apparent or known to one of ordinary skill in the art, such technologies encompass those apparent or known to the skilled artisan now or at any time in the future.

As used herein, the terms "a," "an," and "the" are to be understood as meaning both singular and plural, unless explicitly stated otherwise. Thus, "a," "an," and "the" (and grammatical variations thereof where appropriate) refer to one or more.

As used herein, the term "about" or "approximately" means within an acceptable range for a particular value as determined by one skilled in the art, and may depend in part on how the value is measured or determined, e.g., the limitations of the measurement system or technique.

A group of items linked with the conjunction "and" is not to be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances is not to be read to mean that the narrower case is intended or required in instances where such broadening phrases may be absent. As will become apparent to one of ordinary skill in the art after reading this document, the illustrated embodiments and their various alternatives may be implemented without confinement to the illustrated examples.

The presence of broadening words and phrases such as "one or more," "at least," "but not limited to" or other like phrases in some instances shall not be read to mean that the narrower case is intended or required in instances where such broadening phrases may be absent.

Reference will now be made to the embodiments of the present invention, examples of which are illustrated by and described in conjunction with the accompanying drawings and examples. While certain embodiments are described herein, it will be understood by one skilled in the art that the described embodiments herein do not limit the scope of the invention, as many variations are possible. The specification, including the examples, is intended to be exemplary only, and it will be apparent to those skilled in the art that the present disclosure is intended to cover alternatives, modifications, and equivalents without departing from the scope or spirit of the invention as defined by the appended claims.

Furthermore, while certain details in the present disclosure are provided to convey a thorough understanding of the invention as defined by the appended claims, it will be apparent to those skilled in the art that certain embodiments may be practiced without these details. Moreover, in certain instances, well-known methods, procedures, or other specific details have not been described to avoid unnecessarily obscuring aspects of the invention defined by the appended claims.

DETAILED DESCRIPTION

FIG. 1 shows a side view and FIGS. 2-3 show a perspective view of a preferred embodiment of the present invention. Car seat 1 is typically used to support a baby, toddler or small child in the seat of an automobile. Car seat 1 includes slots 8 which are used to connect car seat 1 to a car seat base which is typically strapped down in the back seat of an automobile.

For the present invention and as shown in the drawings, car seat 1 is attached to seat dolly 2 to form a stroller. Seat dolly 2 includes connection axle 3 having wheels 4. Handle 5, as defined in the art, is also connected to connection axle 3 via handle attachment piece 6. It should be noted that handle 5 can be attached to either side of connection axle 3.

Connection axle 3 includes indentations 7 and car seat 1 includes preexisting features such as slots 8. Indentations 7 correspond to slots 8. To install car seat 1 onto connection axle 3 the user positions car seat 1 over connection axle 3 so that slots 8 align with indentations 7. Car seat 1 is then slip fit onto connection axle 3 and is held in place by friction force between slots 8 and indentations 7 and also by gravity and the weight of car seat 1. Handle 5 is connected to connection axle 3 via handle attachment piece 6. The user is able to easily push or pull the seat dolly 2 by holding handle 5 and walking.

It should be noted that connection axle 3 connects to the preexisting features of slots 8 of car seat 1. No further connection mechanism is necessary. No further modification to car seat 1 is necessary. The connection of car seat 1 and connection axle 3 provides the only support for car seat 1. This simple connection greatly simplifies dolly 2 and distinguishes dolly 2 from prior art strollers which utilize a variety of complicated connection mechanisms to attach the child seat. Preferably, the only means of connection is that formed by the slip fit between slots 8 and indentations 7.

Figure 4:
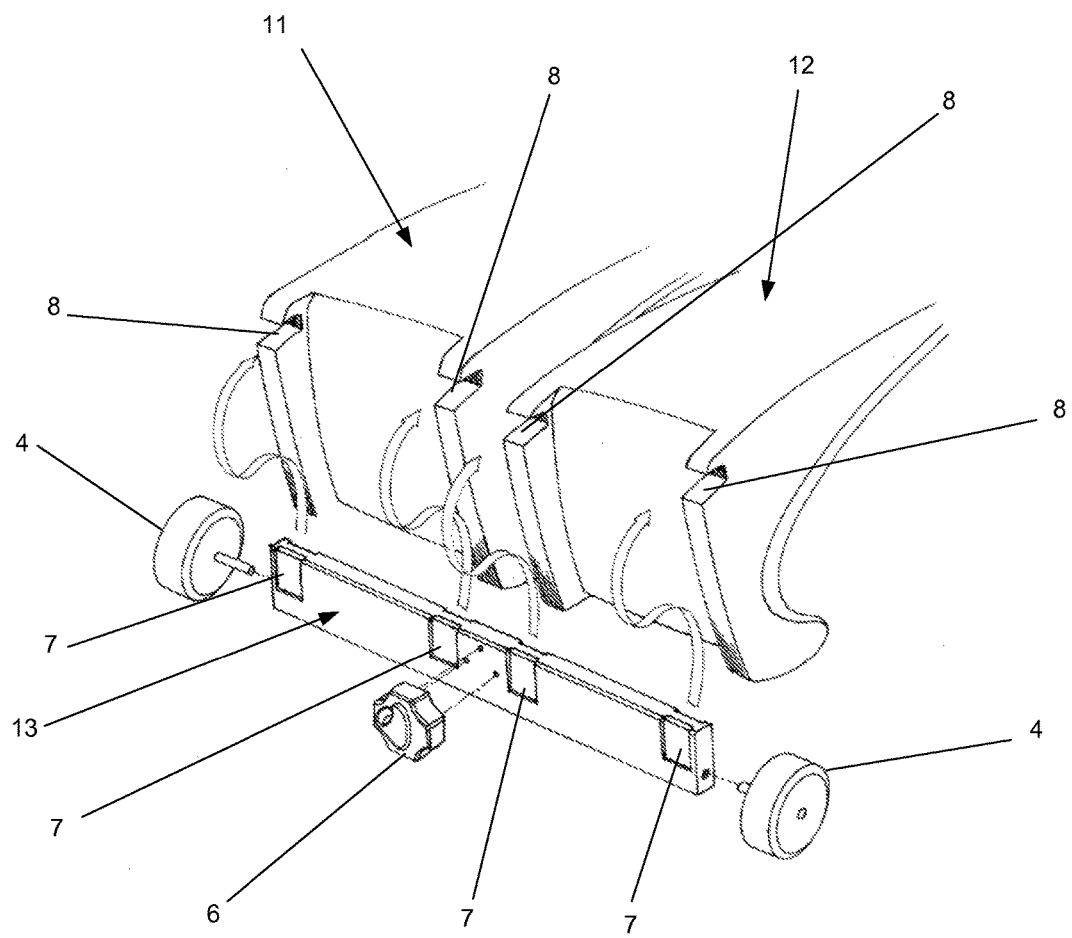
FIG. 4 shows another preferred embodiment of the present invention.

FIG. 4 shows another preferred embodiment of the present invention in which two car seats 11 and 12 are connected simultaneously to connection axle 13 to form a stroller. Connection axle 13 includes wheels 4 and handle attachment piece 6.

Connection axle 13 includes indentations 7 and car seats 11 and 12 include slots 8. Indentations 7 correspond to slots 8. To install car seats 11 and 12 onto connection axle 13 the user positions car seats 11 and 12 over connection axle 13 so that slots 8 align with indentations 7. Car seats 11 and 12 are then slip fit onto connection axle 13 and are held in place by friction force between slots 8 and indentations 7 and also by gravity and the weight of car seats 11 and 12. Handle 5 (FIGS. 1-3) is connected to connection axle 13 via handle attachment piece 6. The user is able to easily push or pull the stroller by holding handle 5 and walking.

Figure 5:
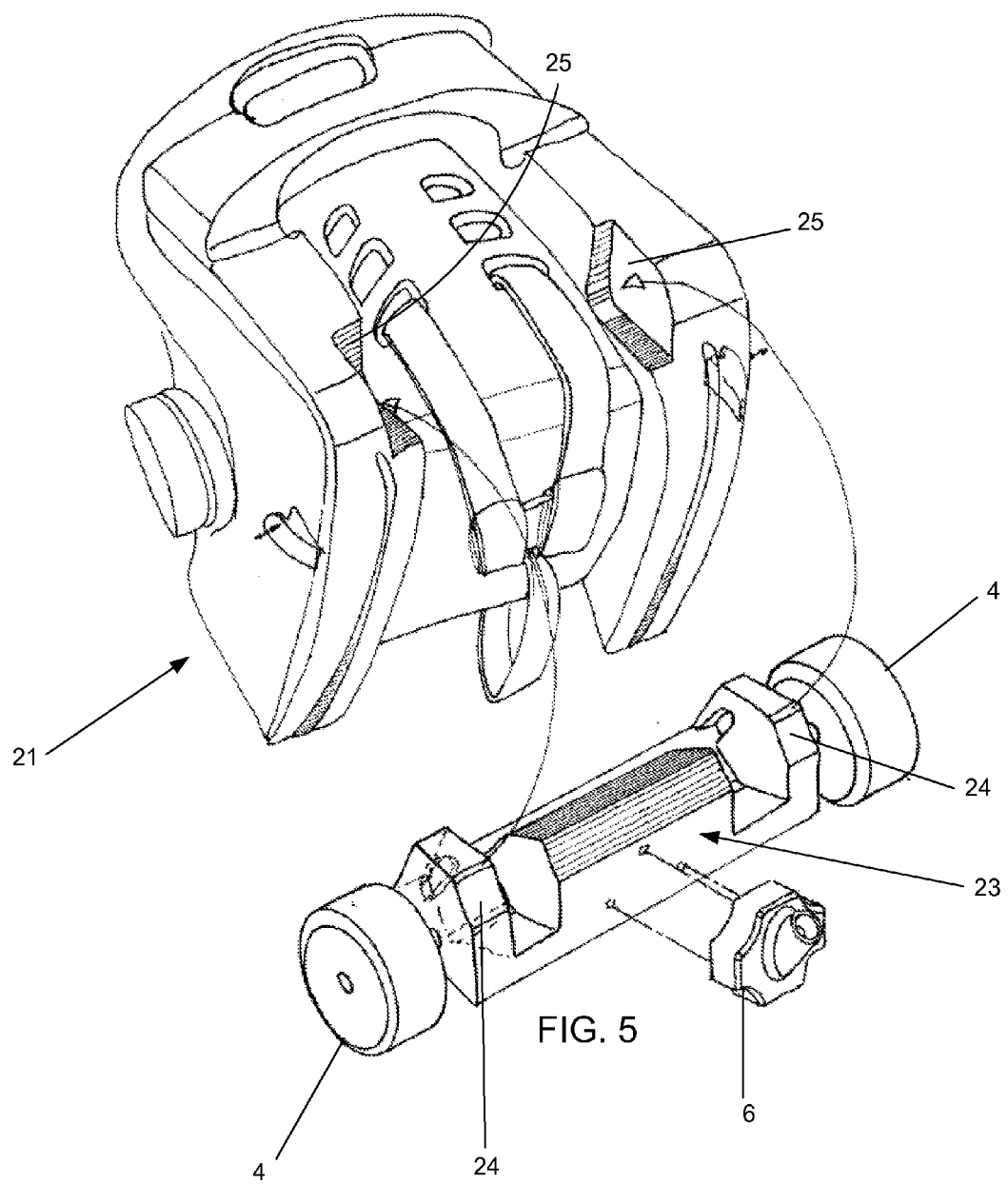
FIG. 5 shows another preferred embodiment of the present invention.

FIG. 5 shows another preferred embodiment of the present invention in which car seat 21 is connected to connection axle 23 to form a stroller. Connection axle 23 includes wheels 4 and handle attachment piece 6.

Connection axle 23 includes extensions 24 and car seat 21 includes indentions 25. Indentations 25 correspond to extensions 24. To install car seat 21 onto connection axle 23 the user positions car seat 21 over connection axle 23 so that indentions 25 align with extensions 24. Car seat 21 is then slip fit onto connection axle 23 and is held in place by friction force between indentions 25 and extensions 24 and also by gravity and the weight of car seat 21. Handle 5 (FIGS. 1-3) is connected to connection axle 23 via handle attachment piece 6. The user is able to easily push or pull the stroller by holding handle 5 and walking.

Figure 6:
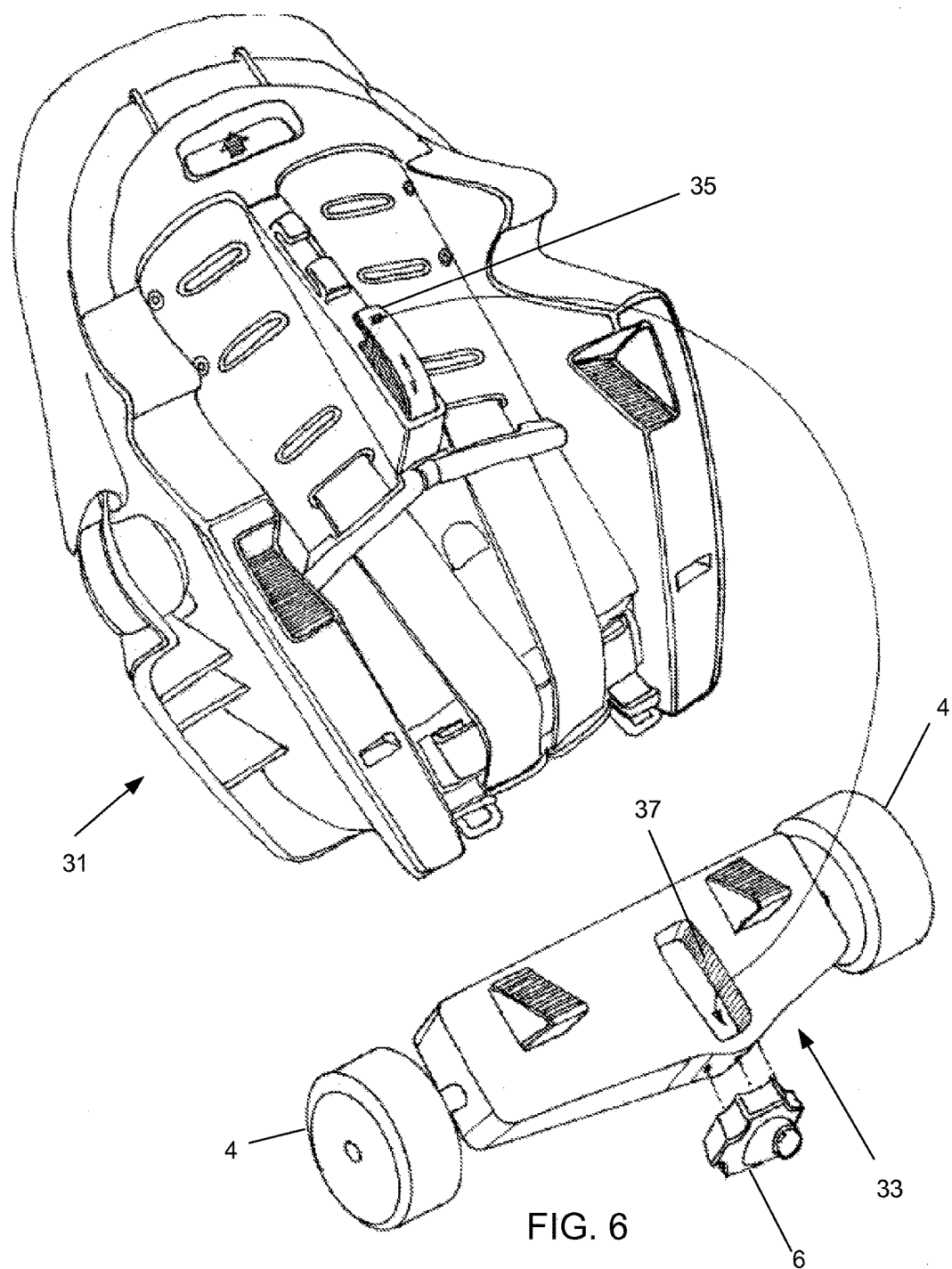
FIG. 6 shows another preferred embodiment of the present invention.

FIG. 6 shows another preferred embodiment of the present invention in which car seat 31 is connected to connection axle 33 to form a stroller. Connection axle 33 includes wheels 4 and handle attachment piece 6.

Connection axle 33 includes slot 37 and car seat 31 includes hook 35. Slot 37 corresponds to hook 35. To install car seat 31 onto connection axle 33 the user positions car seat 31 over connection axle 33 so that hook 35 aligns with slot 37. Car seat 31 is then slip fit onto connection axle 33 and is held in place by friction force between hook 35 and slot 37 and also by gravity and the weight of car seat 31. Handle 5 (FIGS. 1-3) is connected to connection axle 33 via handle attachment piece 6. The user is able to easily push or pull the stroller by holding handle 5 and walking.

Third Wheel Embodiment

Figure 7:
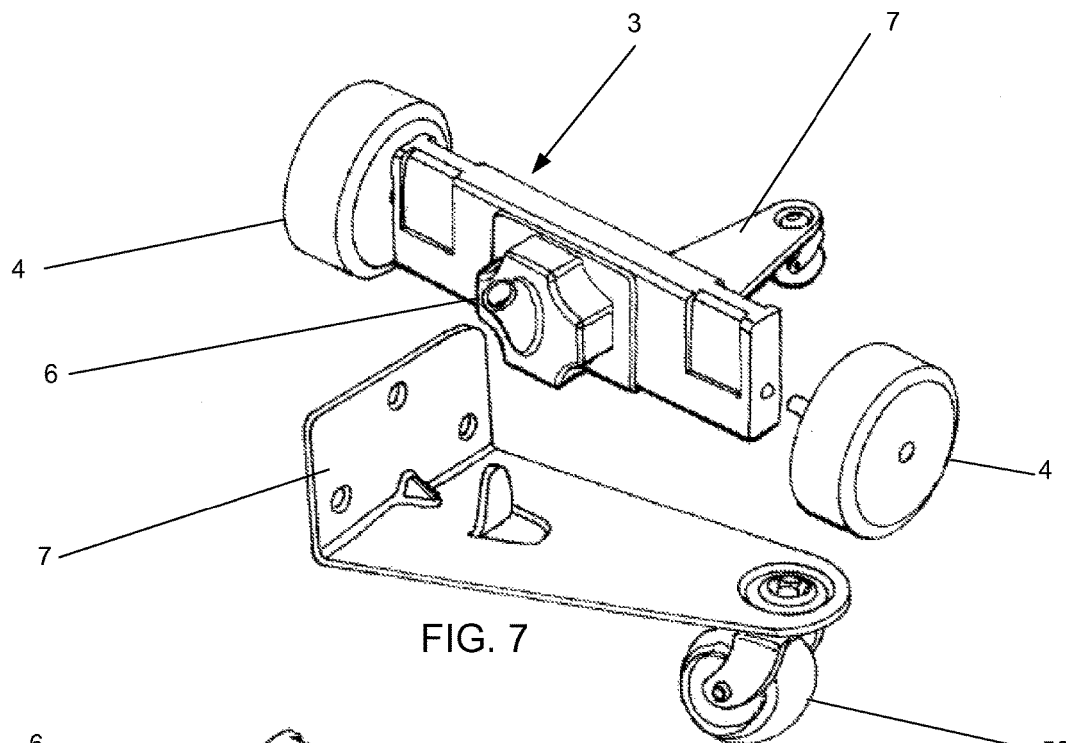
FIGS. 7 and 8 shows a preferred connection axle with a third wheel attached.
Figure 8:
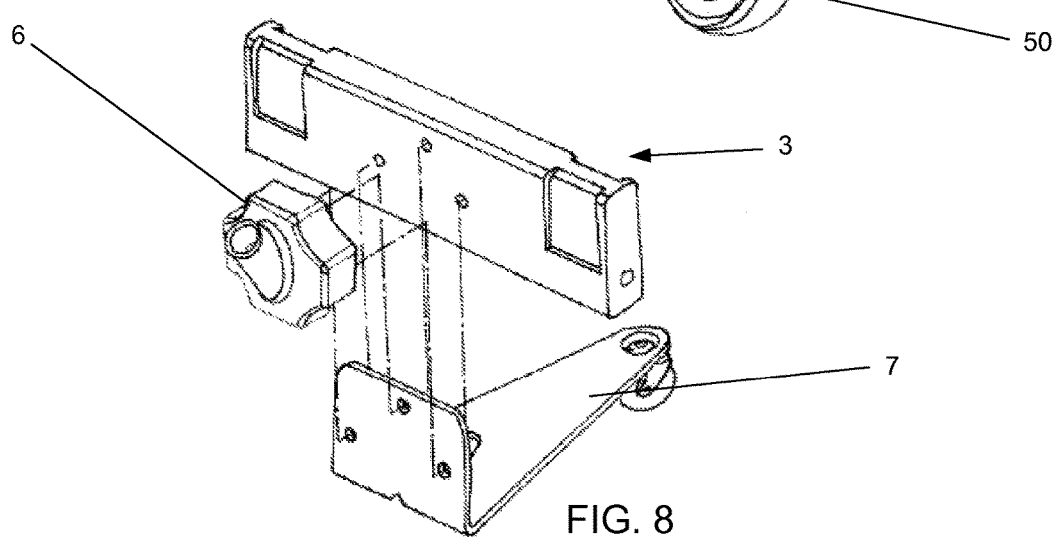

All the above preferred embodiments function very efficiently by utilization of the two wheels 4 as described. However, in another preferred embodiment (FIGS. 7-8) it is also possible to connect third wheel 50 to the stroller. Wheel 5 is pivotally connected to bracket 7 as shown. Bracket 7 is rigidly connected to connection axle 3. Connection axle 3 also includes handle attachment piece 6. Wheel 50 allows for increased stability and ease of use for the stroller.

Other Embodiments

In addition to the above described embodiments, it should be understood that many other embodiments are also possible. For example, in addition to the two wheeled embodiment and three wheeled embodiment disclosed above, it would also be possible to fabricate a four wheeled embodiment with a forward axle for the front two wheels. Also, shock absorbers could be utilized on the wheels. The wheels can be fabricated from a variety of materials. The stroller could have a solid design with a slotted base and slotted wheels. Two strollers can be put together for twin seats. Two handles can be used on the twin seats or a single handle can be used. The handle or handles can have a fixed height or the height can be adjustable. The handle can be so that it has different positions and variety of shapes. The handle, connection axle and handle attachment piece can be molded as one piece. The handle attachment piece can be mounted to the connection axle with screws and dowel pins to keep it from turning. The handle attachment piece can be molded with threads to receive the male threads at the end of the handle. The handle can be mounted with safety pin onto the connection axle. The handle can be glued to the connection axle. The stroller can be one solid piece with handles attached. The components of the preferred embodiments can be fabricated from a variety of shapes and from a variety of materials. In addition to the above described embodiments it should be understood that many other variations are also possible.

Although the above-preferred embodiments have been described with specificity, persons skilled in this art will recognize that many changes to the specific embodiments disclosed above could be made without departing from the spirit of the invention. Therefore, the attached claims and their legal equivalents should determine the scope of the invention.

What is claimed is:

1. A dolly for removable connection to a child car seat to form a stroller, said dolly comprising:
    A. a connection axle comprising an axially aligned connection mechanism for removably connecting said connection axle to preexisting features on said child car seat,
    B. at least two wheels rotatably connected to said connection axle, and
    C. at least one handle connected to said connection axle, wherein said connection of said axially aligned connection mechanism to said child car seat provides the only support for said car seat, wherein said connection of said dolly to said car seat is a removable connection so that when said car seat is inserted inside a car said dolly is not connected to said car seat and so that when said car seat is utilized as a stroller said dolly is connected to said car seat.

2. The dolly as in claim 1, further comprising a handle attachment piece connected between said connection axle and said handle.

3. The dolly as in claim 1 wherein said connection mechanism is two connection axle indentations and two car seat slots, wherein said two car seat slots are slip fit onto said two connection axle indentations and wherein said car seat is held in place by friction force between said two car seat slots and said two connection axle indentations.

4. The dolly as in claim 1 wherein said connection mechanism is a connection axle slot and a car seat hook, wherein said car seat hook is slip fit into said connection axle slot and wherein said car seat is held in place by friction force between said car seat hook and said connection axle slot.

5. The dolly as in claim 1 wherein said preexisting features comprise slots, extensions or indentations allowing for attachment to said dolly and removal from said dolly.

6. The dolly as in claim 1, wherein said child car seat is two child car seats and wherein said two child car seats are connected to said connection axle via said connection mechanism.

7. The dolly as in claim 1, wherein said child car seat is two child car seats and wherein said connection mechanism is two connection axle extensions and two car seat indentations, wherein said two car seat indentations are slip fit onto said two connection axle extensions and wherein said car seat is held in place by friction force between said two car seat indentations and said two connection axle extensions.

8. The dolly as in claim 1 wherein said connection mechanism is a connection axle slot and a car seat extension, wherein said car seat extension is slip fit onto said connection axle slot and wherein said car seat is held in place by friction force between said car seat extension and said connection axle slot.

9. The dolly as in claim 1, further comprising:
    A. a third wheel bracket rigidly connected to said connection axle, and
    B. a third wheel rotatably and pivotally connected to said third wheel bracket.

10. The dolly as in claim 2, wherein said handle is threaded onto said handle attachment piece.

11. The dolly as in claim 6, wherein said two child car seats are positioned side by side.

12. The dolly as in claim 1, wherein said at least one handle is two handles.

13. A dolly for connection to a child car seat to form a stroller, said dolly comprising:
    A. a connection axle comprising a connection mechanism for connecting said connection axle to preexisting features on said child car seat, wherein said connection mechanism is two connection axle indentations and two car seat slots, wherein said two car seat slots are slip fit onto said two connection axle indentations and wherein said car seat is held in place by friction force between said two car seat slots and said two connection axle indentations,
    B. at least two wheels rotatably connected to said connection axle, and
    C. at least one handle connected to said connection axle,
    D. a handle attachment piece connected between said connection axle and said handle
    wherein said connection of said connection axle to said child car seat provides the only support for said car seat.

14. A method for using a child car seat removably connected to a dolly, comprising the steps of:
    A. connecting said child car seat to said dolly, said dolly comprising:
        i. a connection axle comprising an axially aligned connection mechanism for removably connecting said connection axle to preexisting features on said child car seat,
        ii. at least two wheels rotatably connected to said connection axle, and
        iii. at least one handle connected to said connection axle, wherein said connection of said axially aligned connection mechanism to said child car seat provides the only support for said car seat, and
    B. moving said car seat by grasping said at least one handle and walking,
    C. detaching said dolly from said car seat,
    D. inserting said car seat into a car.

15. The method as in claim 14, further comprising a handle attachment piece connected between said connection axle and said handle.

16. The method as in claim 14, wherein said connection mechanism is two connection axle indentations and two car seat slots, wherein said two car seat slots are slip fit onto said two connection axle indentations and wherein said car seat is held in place by friction force between said two car seat slots and said two connection axle indentations.

17. The method as in claim 14, wherein said child car seat is two child car seats and wherein said two child car seats are connected to said connection axle via said connection mechanism.

18. The method as in claim 14, wherein said child car seat is two child car seats and wherein said connection mechanism is two connection axle extensions and two car seat indentations, wherein said two car seat indentations are slip fit onto said two connection axle extensions and wherein said car seat is held in place by friction force between said two car seat indentations and said two connection axle extensions.

19. The method as in claim 14, wherein said connection mechanism is a connection axle slot and a car seat extension, wherein said car seat extension is slip fit onto said connection axle slot and wherein said car seat is held in place by friction force between said car seat extension and said connection axle slot.

20. The method as in claim 14, further comprising:
    A. a third wheel bracket rigidly connected to said connection axle, and
    B. a third wheel rotatably and pivotally connected to said third wheel bracket, wherein said handle is threaded onto said handle attachment piece.

21. The dolly as in claim 1, wherein said connection mechanism is slip fit onto said preexisting features of said car seat.

\* \* \* \* \*